(12) United States Patent
Kasper et al.

(10) Patent No.: US 6,363,570 B2
(45) Date of Patent: Apr. 2, 2002

(54) UPRIGHT EXTRACTION CLEANING MACHINE WITH ILLUMINATION

(75) Inventors: Gary A. Kasper, Grand Rapids; Alan J. Krebs, Pierson, both of MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 0 days.

(21) Appl. No.: 09/803,264

(22) Filed: Mar. 9, 2001

Related U.S. Application Data

(63) Continuation-in-part of application No. 09/753,349, filed on Jan. 2, 2001, which is a continuation-in-part of application No. 09/112,527, filed on Jul. 8, 1998, now Pat. No. 6,167,587.
(60) Provisional application No. 60/188,575, filed on Mar. 10, 2000, provisional application No. 60/075,924, filed on Feb. 25, 1998, and provisional application No. 60/052,021, filed on Jul. 9, 1997.

(51) Int. Cl.[7] ................................. A47L 11/20
(52) U.S. Cl. ............... 15/320; 15/324; 15/339
(58) Field of Search ............ 15/320, 324, 339

(56) References Cited

U.S. PATENT DOCUMENTS

| 1,996,934 | A | * | 4/1935 | Siedle ...................... 15/324 X |
| 2,221,746 | A | | 11/1940 | Kirby |
| 3,848,291 | A | | 11/1974 | Morse |
| 4,114,229 | A | | 9/1978 | Jones et al. |
| 4,392,271 | A | | 7/1983 | Sepke |
| 4,559,665 | A | | 12/1985 | Fitzwater |
| 4,757,574 | A | | 7/1988 | Sumerau |
| 4,791,700 | A | | 12/1988 | Bigley et al. |
| 5,233,723 | A | * | 8/1993 | Hung ........................... 15/339 |
| D345,830 | S | | 4/1994 | Furcron et al. |
| 5,467,501 | A | | 11/1995 | Sepke |
| 5,575,035 | A | | 11/1996 | Reis et al. |
| 5,987,697 | A | | 11/1999 | Song et al. |
| 6,006,402 | A | | 12/1999 | Maurer et al. |
| 6,253,414 | B1 | * | 7/2001 | Bradd et al. .............. 15/324 X |
| 6,256,832 | B1 | * | 7/2001 | Dyson ......................... 15/324 |
| 6,289,552 | B1 | * | 9/2001 | McCormick ................. 15/324 |

FOREIGN PATENT DOCUMENTS

| GB | 600236 | * | 4/1948 | .................. 15/324 |

* cited by examiner

*Primary Examiner*—Chris K. Moore
(74) *Attorney, Agent, or Firm*—McGarry Bair LLP

(57) ABSTRACT

A portable surface cleaning apparatus having a floor-traveling base module and an upright handle pivotally mounted to the base module, a liquid dispensing system including a dispensing nozzle associated with the base module and fluidly connected to a fluid supply chamber, a fluid recovery system including a suction nozzle associated with the base module and fluidly connected to a vacuum source and a recovery chamber, a window in the base module, and an illumination source behind the window for illuminating an area underneath and in front of the base module.

20 Claims, 4 Drawing Sheets

UPRIGHT EXTRACTION CLEANING MACHINE WITH ILLUMINATION

CROSS-REFERENCE TO RELATED APPLICATIONS

This application claims the benefit of U.S. Provisional Application Ser. No. 60/188,575, filed Mar. 10, 2000, and is a continuation-in-part of U.S. patent application Ser. No. 09/753,349, filed Jan. 2, 2001, which is a continuation-in-part of U.S. patent application Ser. No. 09/112,527, filed Jul. 8, 1998, entitled UPRIGHT EXTRACTION CLEANING MACHINE, now U.S. Pat. No. 6,167,587, issued Jan. 2, 2001, which claims the benefit of U.S. Provisional Application Ser. No. 60/075,924, filed on Feb. 25, 1998, and U.S. Provisional Application Ser. No. 60/052,021, filed on Jul. 9, 1997.

BACKGROUND OF THE INVENTION

1. Field of the Invention

This invention relates to an extraction cleaning machine. In one of its aspects, the invention relates to an upright extraction cleaning machine with floor illumination. In another of its aspects, the invention relates to an upright extraction cleaning machine with suction nozzle illumination. In another of its aspects, the invention relates to an upright extraction cleaning machine with agitation chamber transparency and illumination.

2. Description of Related Art

Upright extraction cleaning machines have been used for removing dirt from surfaces such as carpeting, upholstery, drapes and the like. The known extraction cleaning machines can be in the form of a canister-type unit as disclosed in U.S. Pat. No. 5,237,720 to Blase et al. or an upright unit as disclosed in U.S. Pat. No. 5,500,977 to McAllise et al. and U.S. Pat. No. 4,559,665 to Fitzwater.

A transparent suction nozzle in an extraction cleaner is disclosed in U.S. Design Pat. No. D345,830 to Furcron et al. as well as Fitzwater '665. U.S. Pat. No. 4,392,271 to Sepke discloses a window for viewing a rotatable brush in an upright vacuum cleaner. Vacuum cleaners having an illumination source mounted external to the floor-traveling head are also known for illuminating an area of the floor in front of the vacuum cleaner.

SUMMARY OF THE INVENTION

According to the invention, a portable surface cleaning apparatus comprises a base module for movement along a surface; an upright handle pivotally attached to the base module; a liquid dispensing system comprising a liquid dispensing nozzle associated with the base module for applying liquid to a surface to be cleaned; a fluid supply chamber for holding a supply of cleaning fluid; a fluid supply conduit fluidly connected to the fluid supply chamber and to the dispensing nozzle for supplying liquid to the dispensing nozzle; a fluid recovery system comprising: a fluid recovery chamber; a suction nozzle associated with the base module; a working air conduit extending between the recovery chamber and the suction nozzle; and a vacuum source in fluid communication with the recovery chamber for generating a flow of working air from the suction nozzle through the working air conduit and through the recovery chamber to thereby draw dirty liquid from the surface to be cleaned through the suction nozzle and working air conduit and into the recovery chamber; and the suction nozzle including a window that is at least partially transparent and an illumination source behind the window.

In a further embodiment, the base module further comprises an opaque upper housing. The base module further comprises a brush housing enclosing an agitation brush. The window forms a portion of a wall of the brush housing and the brush housing is illuminated by the illumination source. The transparent panel is positioned between the illumination source and the brush housing. The illumination source projects through the window to illuminate a portion of a surface to be cleaned.

The base module has a housing which is partially opaque and has a transparent window for viewing a brush chamber in the base module. In one embodiment, the window is removably attached to the housing of the base module by a snap-fit connection. In another embodiment, the window is attached to the housing by screws. Preferably, the window forms a portion of a bottom wall of the working air conduit. An upper wall of the working air conduit is transparent. The brush chamber includes a transparent cover over an illumination source for illuminating the brush chamber. Desirably, the transparent cover is integral with the transparent window and fluidly isolates the illumination source from the brush chamber.

In a further embodiment, the base module has a partially opaque housing with a transparent window for viewing a brush chamber in the base module, and an illumination source in the base module for illuminating the brush chamber, the illumination source and window further configured to illuminate an area of a surface to be cleaned.

DESCRIPTION OF THE PREFERRED EMBODIMENT

U.S. patent application Ser. No. 09/112,527 filed Jul. 8, 1998, now U.S. Pat. No. 6,167,587, issued Jan. 2, 2001, and U.S. patent application Ser. No. 09/753,349, filed Jan. 2, 2001, commonly owned with this application, are incorporated herein by reference in their entirety.

Figure 1:
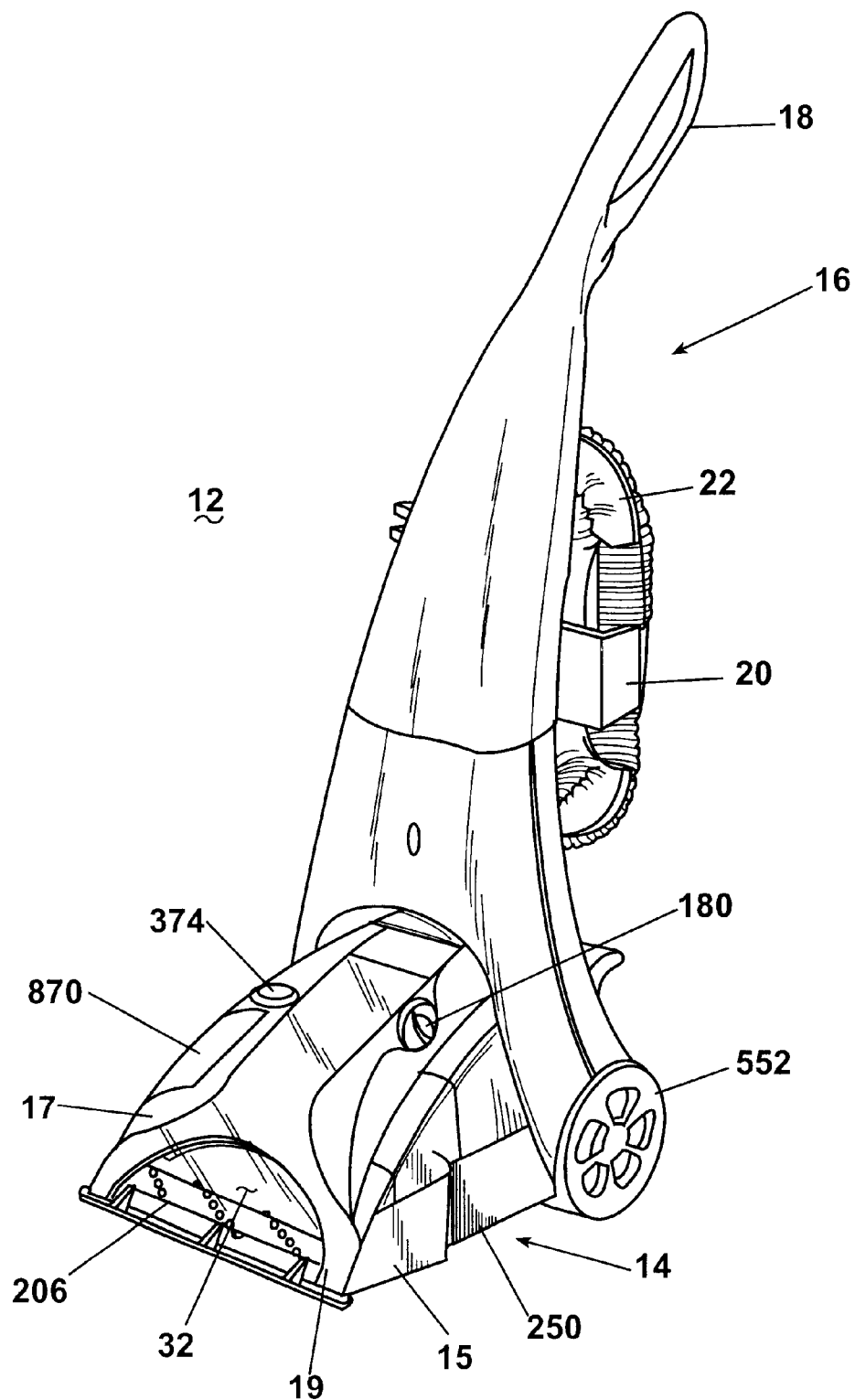
FIG. 1 is a perspective view of the extraction cleaning machine according to the invention.

Referring now to the drawings and to FIG. 1 in particular, the upright extraction cleaning machine 12 comprises a base module 14 adapted to roll across a surface to be cleaned on wheels 552, and an upright handle assembly 16 pivotally mounted to a rear portion of the base module 14. The base module 14 comprises a lower housing portion 15 and an upper housing portion 17, together defining an interior for housing components such as an agitation brush 206. The upright handle assembly 16 includes a closed loop grip 18 at an upper portion thereof and a cord and hose wrap 20 for carrying an accessory hose 22. The base module 14 further comprises a transparent facing 19 fixed to an upper portion of the upper housing portion 17, and a transparent panel 32 fixed to the lower housing portion 15 beneath and substantially parallel to the transparent facing 19.

Figure 2:
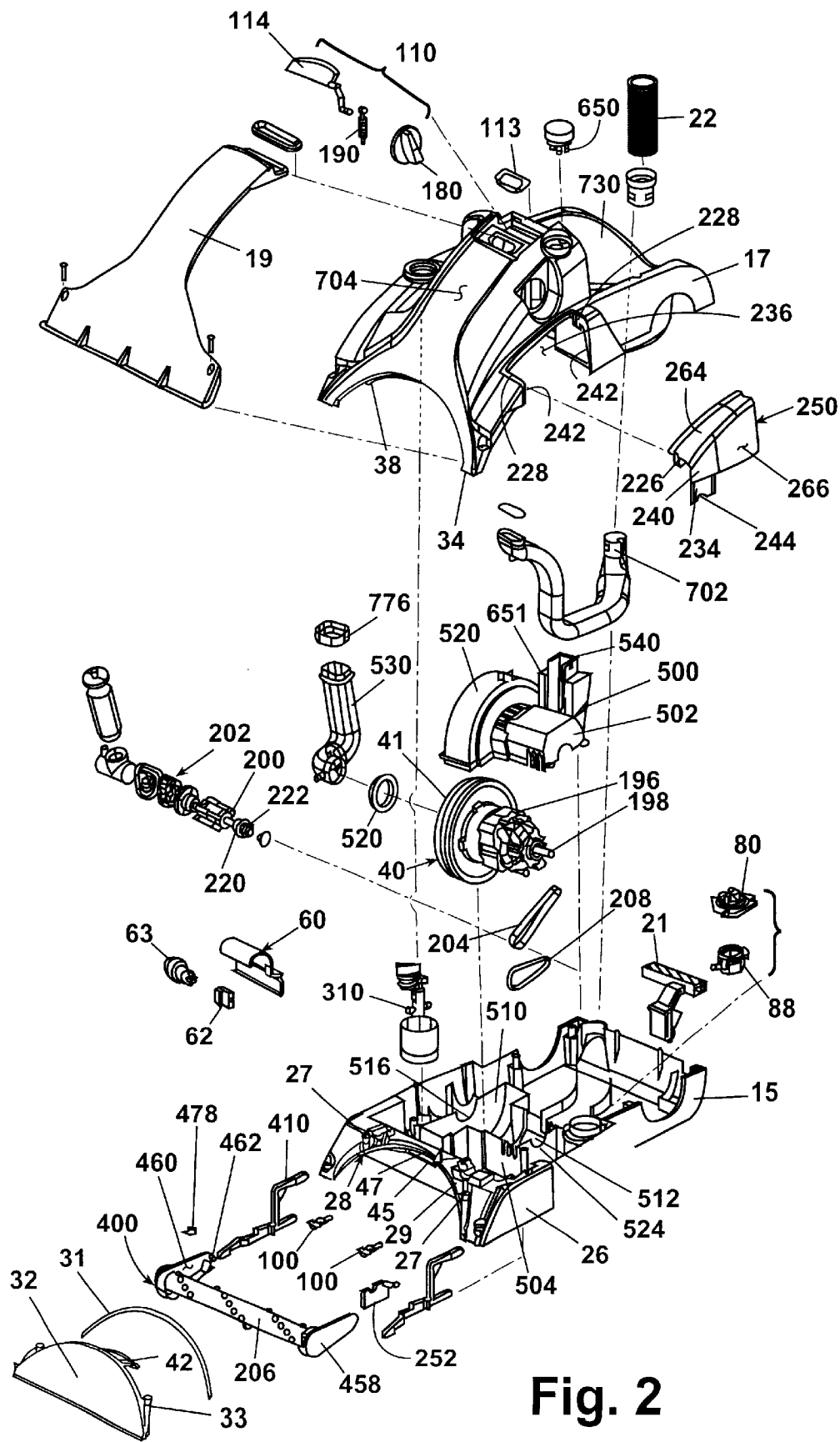
FIG. 2 is an exploded view of a base module of the extraction cleaning machine shown in FIG. 1.
Figure 3:
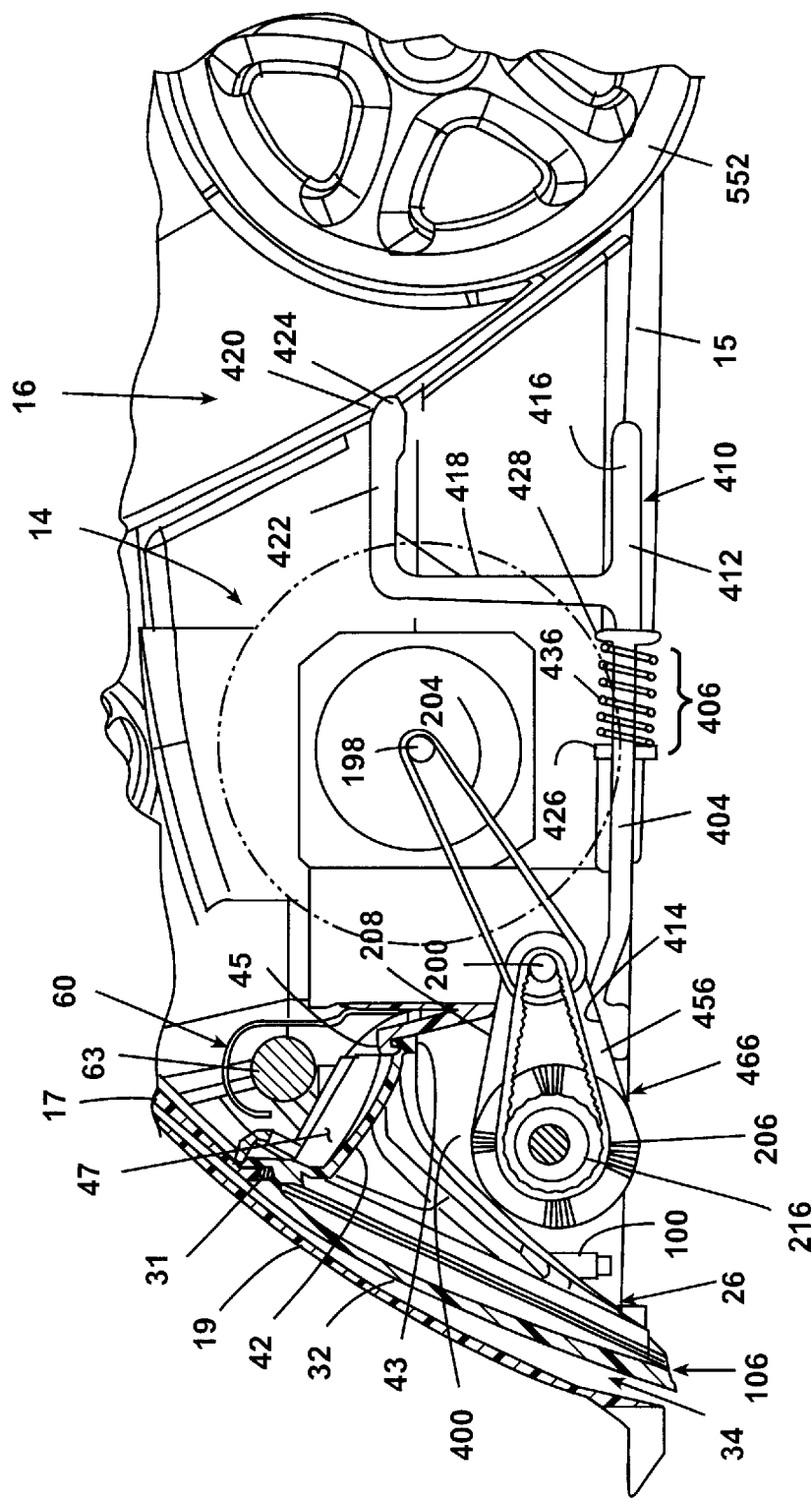
FIG. 3 is a partial cross-sectional side view of the base module of the extraction cleaning machine of FIGS. 1–2.

Referring to FIGS. 2 and 3, the lower housing portion 15 includes a brush housing 26 at a front portion thereof for housing a rotatably driven agitation brush 206. The brush housing 26 includes an arcuate opening 28 at a front portion thereof for receiving the transparent panel 32. The edge of the arcuate opening 28 substantially corresponds to the shape of the transparent panel 32. The transparent panel 32 is mounted to the brush housing 26. The upper housing portion 17 has at a front portion thereof an arcuate opening 38 with an edge substantially conforming to the shape of the transparent panel 32 and to the edge of the arcuate opening 28 of the brush housing 26. The arcuate opening 38 of the upper housing portion 17 mounts on a rim 29 formed in either the transparent panel 32 or the arcuate opening 28 of the brush housing 26. The connection between the upper housing portion 17 and the rim 29 is made watertight by the inclusion of a rope gasket 31 therebetween. When the rim 29 is not formed in the transparent panel 32, the transparent panel 32 can also be secured in a watertight fashion to the brush housing 26. The upper housing portion 17 thus forms an interior face of a suction nozzle 34 in conjunction with the transparent panel 32. The transparent facing 19 is mounted in a watertight fashion over a working air conduit 704 formed in the upper face of the upper housing portion 17. The suction nozzle 34 fluidly connects the conduit 704 to the atmosphere at the surface to be cleaned. The transparent facing 19 thus forms the exterior wall of the conduit 704 and the exterior face of the suction nozzle 34. The suction nozzle 34 is therefore transparent, enabling the user to see through the front face of the base module 14 to the floor below the base module 14, and into the brush housing 26 to see the brush 206 contained therein, as well as to view the flow of fluid through the suction nozzle 34.

The transparent panel 32 is formed with a transparent cover or lens 42 projecting from a rear portion thereof. The lens 42 has a lens edge 43 distal from the panel 32 that interfits with a lip 45 on the brush housing 26 to firmly seat the lens 42 on the brush housing 26. The lens 42 is further aligned with and spans a lens opening 47 in an upper portion of the brush housing 26 behind the front portion of the brush housing 26. The cover or lens 42 can have optical properties for directing or modifying light projecting from a light source, but the invention is not so limited. It is anticipated that the cover or lens 42 can be configured to pass light without modification.

A heat shield 60 and a lamp socket 62 are mounted on the brush housing 26, substantially aligned with the opening 47. A lamp 63 is mounted into the lamp socket 62. As electrical energy is applied selectively to the lamp 63, light from the lamp 63 passes through the opening 47 and lens 42. The lamp 63 thus illuminates the interior of the brush housing 26, the brush 206 mounted in the brush housing 26, and the floor covered by the brush housing 26. The lamp 63 and lens 42 are further configured within the upper portion of the brush housing 26 to further direct light toward the front portion of the housing 26 and thereby illuminate the suction nozzle 34 and the floor directly to the front of the suction nozzle 34 due to the transparency of transparent panel 32 and transparent facing 19. Light from lamp 63 is generally restricted to the housing 26 and the surface in front of the cleaner by the heat shield 60 and the opacity of the upper housing 17.

The illuminated nozzle assembly provides the user with a viewable brush 206 and illuminates the brush 206 and the area being cleaned. Further, it provides the user a serviceable lamp 63. Lamp 63 is serviceable from beneath the base module 14. In the preferred embodiment, transparent panel 32 is mounted to the brush housing 26 by screws that extend through integrally molded bosses 33 on the transparent panel 32 and into threaded sockets 27 in the brush housing 26. It is further anticipated that transparent panel 32 can be secured to housing 26 in a snap-fit relationship.

Figure 4:
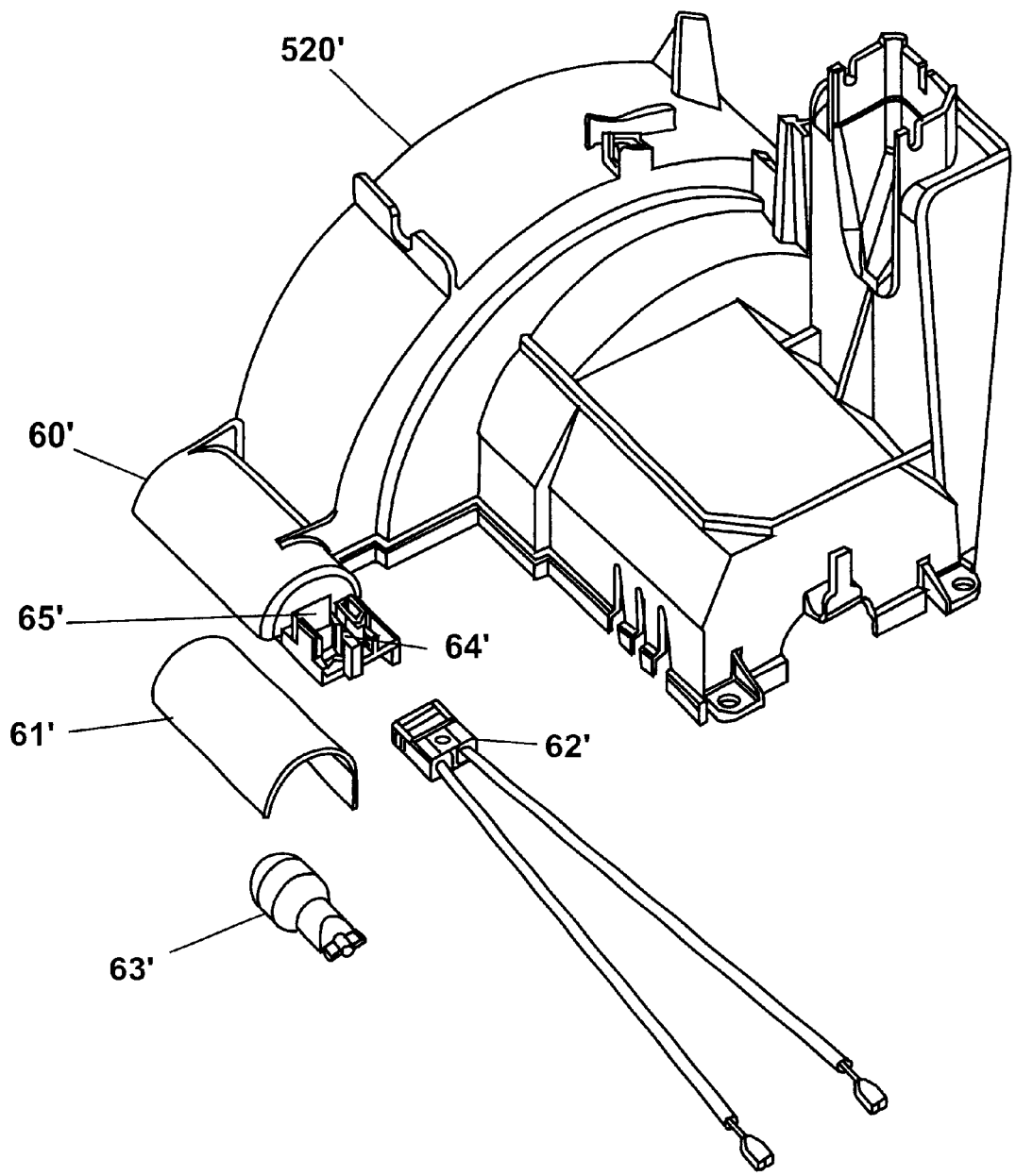
FIG. 4 is a perspective view of a further embodiment of an integral motor housing and lamp housing according to the invention.

In a further embodiment of the invention shown in FIG. 4, a semi-cylindrical lamp housing 60' is molded integrally with the upper motor housing 520'. The lamp housing 60' includes a molded lamp socket cavity 64' for receiving socket 62' for alignment with an aperture 65' into the lamp housing 60'. The interior of the lamp housing 60' is further covered with a heat/light reflective tape or coating 61'. This coating 61' serves to reflect and direct light from the lamp 63' through the cover or lens 42 into the brush housing and further onto the floor in front of the base module 14. The heat reflective aspect of coating 61' serves to resist excessive heat buildup or transmission from the lamp 63' to the lamp housing 60', which, in the preferred embodiment, is of injection-molded construction.

Lamp 63' is mounted in socket 62' for operational positioning in lamp housing 60'. Lamp 63' is axially inserted into or removed from socket 62' through aperture 65'. The user can access lamp 63' from an underside of base module 14, upon removal of integrally molded panel 32 and lens 42 from the inside of brush housing 26 (see FIG. 2).

Any features shown in FIGS. 1–4, but not described herein, and further elements of the extraction cleaner, are disclosed in U.S. U.S. Pat. No. 6,167,587, issued Jan. 2, 2001, and U.S. patent application Ser. No. 09/753,349, filed Jan. 2, 2001, both of which are hereby incorporated by reference in their entirety.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is embodied in the appended claims.

What is claimed is:

1. A portable surface cleaning apparatus, comprising:
    a base module for movement along a surface;
    an upright handle pivotally attached to the base module;
    a liquid dispensing system comprising:
        a liquid dispensing nozzle for applying liquid to a surface to be cleaned;
        a fluid supply chamber for holding a supply of cleaning fluid;
        a fluid supply conduit fluidly connected to the fluid supply chamber and to the dispensing nozzle for supplying liquid to the dispensing nozzle;
    a fluid recovery system comprising:
        a fluid recovery chamber;
        a suction nozzle;
        a working air conduit extending between the recovery chamber and the suction nozzle; and
    a vacuum source in fluid communication with the recovery chamber for generating a flow of working air from the suction nozzle through the working air conduit and through the recovery chamber to thereby draw dirty liquid from the surface to be cleaned through the suction nozzle and working air conduit and into the recovery chamber;
    the improvement comprising:
        the suction nozzle includes a window that is at least partially transparent and an illumination source is mounted behind the window for illumination of the surface to be cleaned.

2. The portable surface cleaning apparatus of claim 1, wherein the base module further comprises an opaque upper housing.

3. The portable surface cleaning apparatus of claim 1, wherein the base module further comprises a brush housing enclosing an agitation brush.

4. The portable surface cleaning apparatus of claim 3, wherein the window forms a portion of a wall of the brush housing.

5. The portable surface cleaning apparatus of claim 3, wherein the brush housing includes a transparent panel between the illumination source and the brush housing for illumination of a brush chamber within the brush housing.

6. The portable surface cleaning apparatus of claim 1 wherein the suction nozzle is associated with the base module.

7. The portable surface cleaning apparatus of claim 1 wherein the liquid dispensing nozzle is associated with the base module.

8. A portable surface cleaning apparatus, comprising:
a base module for movement along a surface;
an upright handle pivotally attached to the base module;
a liquid dispensing system comprising:
    a liquid dispensing nozzle for applying liquid to a surface to be cleaned;
    a fluid supply chamber for holding a supply of cleaning fluid;
    a fluid supply conduit fluidly connected to the fluid supply chamber and to the dispensing nozzle for supplying liquid to the dispensing nozzle;
a fluid recovery system comprising:
    a fluid recovery chamber;
    a suction nozzle;
    a working air conduit extending between the recovery chamber and the suction nozzle; and
    a vacuum source in fluid communication with the recovery chamber for generating a flow of working air from the suction nozzle through the working air conduit and through the recovery chamber to thereby draw dirty liquid from the surface to be cleaned through the suction nozzle and working air conduit and into the recovery chamber;
the improvement comprising:
    the base module having a partially opaque housing with a window that is at least partially transparent for viewing a brush chamber in the base module.

9. The portable surface cleaning apparatus of claim 8, wherein the window is removably attached to the partially opaque housing of the base module.

10. The portable surface cleaning apparatus of claim 9, wherein the window is attached to the partially opaque housing by a snap-fit connection.

11. The portable surface cleaning apparatus of claim 9, wherein the window is attached to the partially opaque housing by screws.

12. The portable surface cleaning apparatus of claim 8, wherein the window forms a portion of a bottom wall of the working air conduit.

13. The portable surface cleaning apparatus of claim 12, wherein an upper wall of the working air conduit is transparent.

14. The portable surface cleaning apparatus of claim 8, wherein an upper wall of the working air conduit is transparent.

15. The portable surface cleaning apparatus of claim 8 and further comprising an illumination source for illuminating the brush chamber.

16. The portable surface cleaning apparatus of claim 15, further comprising a transparent cover over the illumination source, wherein the transparent cover is integral with the transparent window.

17. The portable surface cleaning apparatus of claim 16, wherein the transparent cover fluidly isolates the illumination source from the brush chamber.

18. A portable surface cleaning apparatus, comprising:
a base module for movement along a surface;
an upright handle pivotally attached to the base module;
a liquid dispensing system comprising:
    a liquid dispensing nozzle for applying liquid to a surface to be cleaned;
    a fluid supply chamber for holding a supply of cleaning fluid;
    a fluid supply conduit fluidly connected to the fluid supply chamber and to the dispensing nozzle for supplying liquid to the dispensing nozzle;
a fluid recovery system comprising:
    a fluid recovery chamber;
    a suction nozzle;
    a working air conduit extending between the recovery chamber and the suction nozzle; and
    a vacuum source in fluid communication with the recovery chamber for generating a flow of working air from the suction nozzle through the working air conduit and through the recovery chamber to thereby draw dirty liquid from the surface to be cleaned through the suction nozzle and working air conduit and into the recovery chamber;
the improvement comprising:
    the base module has a partially opaque housing with a transparent window for viewing a brush chamber, and an illumination source mounted to the partially opaque housing for illuminating the brush chamber, the illumination source and window are further configured so that the illumination source illuminates an area of a surface to be cleaned adjacent the suction nozzle.

19. The portable surface cleaning apparatus of claim 18 wherein the partially opaque housing further comprises a transparent panel fluidly isolating the illumination source from the brush chamber.

20. The portable surface cleaning apparatus of claim 18, wherein the window forms a portion of a wall of one of the suction nozzle and the working air conduit.

\* \* \* \* \*